United States Patent [19]

Eder

[11] Patent Number: 4,796,484
[45] Date of Patent: Jan. 10, 1989

[54] SHAFT DETENT ASSEMBLY FOR A TIMING MECHANISM

[75] Inventor: Robert L. Eder, Speedway, Ind.

[73] Assignee: Emhart Industries, Inc., Indianapolis, Ind.

[21] Appl. No.: 26,454

[22] Filed: Mar. 17, 1987

[51] Int. Cl.$^4$ .................... F16H 53/00; H01H 7/08; H01H 43/10

[52] U.S. Cl. .................... 74/568 T; 200/38 R; 200/38 B; 200/38 C; 200/38 A

[58] Field of Search ................ 74/568 T, 567, 568 R; 200/27 B, 38 C, 38 FA, 38 FB, 38 BA, 38 R, 38 B

[56] References Cited

U.S. PATENT DOCUMENTS

| | | | |
|---|---|---|---|
| 2,617,900 | 11/1952 | Morrison | 74/568 T |
| 2,953,938 | 9/1960 | Bush | 74/568 T |
| 3,371,170 | 2/1968 | Thomas et al. | 200/38 B |
| 3,431,372 | 3/1969 | Obermann | 200/38 A |
| 3,588,391 | 6/1971 | Banathy | 74/568 T |
| 3,717,043 | 2/1973 | Cartier | 74/568 T |
| 3,914,571 | 10/1975 | Kellogg et al. | 74/568 T |
| 4,079,636 | 3/1978 | Altenschulte et al. | 74/568 T |
| 4,146,760 | 3/1979 | Voland | 200/38 A |
| 4,288,671 | 9/1981 | Morrison | 200/38 A X |
| 4,307,270 | 12/1981 | Smock | 200/38 B |
| 4,348,560 | 9/1982 | Ray et al. | 200/38 FA |
| 4,351,200 | 9/1982 | McElroy | 200/38 BA |
| 4,412,110 | 10/1983 | Wojtanek | 200/38 R |
| 4,413,164 | 11/1983 | Obermann et al. | 200/38 C X |
| 4,436,969 | 3/1984 | Motoki | 74/568 T |
| 4,497,985 | 2/1985 | Courter et al. | 200/38 B X |
| 4,497,986 | 2/1985 | Zink et al. | 200/38 R |
| 4,560,846 | 12/1985 | Klopp et al. | 200/38 R |
| 4,588,304 | 5/1986 | Thoma | 200/38 BA |
| 4,695,683 | 9/1987 | Wingler et al. | 200/38 FB |

FOREIGN PATENT DOCUMENTS

| | | | |
|---|---|---|---|
| 516876 | 3/1955 | Canada | 200/38 FA |
| 2544098 | 10/1984 | France | 74/568 T |
| 1271010 | 4/1972 | United Kingdom | 74/568 T |

Primary Examiner—Gary L. Smith
Assistant Examiner—Vinh Luong
Attorney, Agent, or Firm—Carl A. Forest

[57] ABSTRACT

A timing mechanism comprising a camstack having a hollow hub rotatably mounted between support plates, electrical switches actuated by the camstack as it rotates, a bearing having a bore in it and rotatably journalled in one of the support plates, and a shaft mounted axially in the camstack with one end rotatably supported in the bearing and the other end in the other of the support plates. The shaft is axially movable between a first position and a second position, which positions are determined by a detent assembly comprising two grooves in the shaft and spring fingers located in the bore of the bearing. The fingers engage one groove when the shaft is in the first position and the other groove when the shaft is in the second position.

5 Claims, 2 Drawing Sheets

SHAFT DETENT ASSEMBLY FOR A TIMING MECHANISM

BACKGROUND OF THE INVENTION

The present invention relates to a detent assembly for a timing mechanism and more particularly to such an assembly that is operable in conjunction with an axially displaceable cam carrying shaft to provide a positive location of the shaft.

Timing mechanisms for appliances such as washing machines generally employ a timing cam or camstack which is advanced in a step-by-step manner to program the appliance. The camstack can be manually set through a clutch by the appliance operator; however, during such manual setting all power to the timing mechanism should be shut off. In order to accomplish this, the shaft is manually axially displaced to open a line switch and shut off the power during manual setting of the camstack. The present invention pertains to a detent assembly which insures a positive location of the shaft and which has a minimum number of parts and thus is easier and less expensive to produce.

SUMMARY OF THE INVENTION

Accordingly, there is provided a timing mechanism which in general comprises a camstack having a hollow hub rotatably mounted between support plates and first switch means engaging the camstack to be actuated thereby, a shaft mounted in the camstack for axial movement between first and second positions, a bearing at the end of the shaft rotatably journalled in one of the support plates, and detent means locating the shaft in either of the first and second positions comprising grooves in the end of the shaft, and spring fingers carried by the bearing and selectively engaging the grooves.

DETAILED DESCRIPTION OF THE INVENTION

Figure 1:
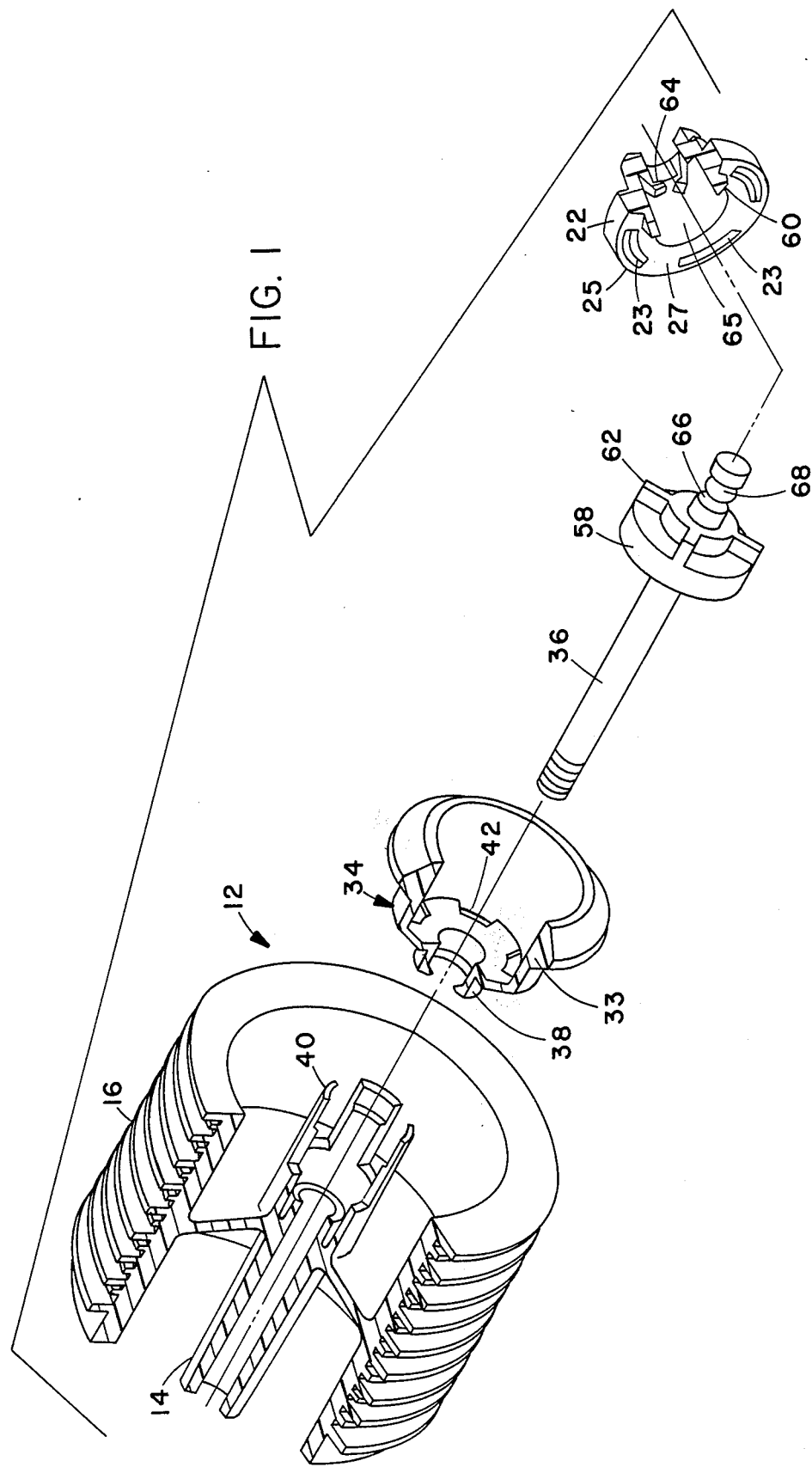
FIG. 1 is an exploded view of a camstack employing the detent assembly of the invention.

Referring now to the drawings, there is shown a timing mechanism 10 employing the invention. Timing mechanism 10, in general, includes a camstack 12 having a hollow hub portion 14 with a plurality of cam lobes on cam tracks 16 extending about the hub portion. A plurality of electrical switches 18 (one shown) engage the camstack to be opened and closed thereby. The switches open and close electrical circuits to an appliance in a manner well known in the art. A shaft 36 extends through the hub portion and is journalled for rotation within the hub and a bearing 22. Bearing 22 is carried in support plate 24 while hub 14 is journalled in support plate 26. Shaft 36 is axially movable to one of two positions. The camstack is coupled to a motor 28 for power driven rotation through gears 30 and 32, gear 32 being provided integral with the camstack.

A line switch actuator 34 is independently rotatably carried on shaft 36. It is "snugly" held on the shaft through a plurality of spring fingers 38 and is coupled to camstack 12 through tangs 40 which extend lengthwise from hollow hub 14 through openings 42 provided in actuator 34. Bearing 22 comprises a cup shaped portion 25 having ribs 27 therein dividing the cup shaped portion into compartments 23. As sown in FIGS. 2 and 3 bearing 22 also includes a bore 65 and spring fingers 64 which are integrally formed with the bearing and extend back from one end of the bearing into the bore 65. Tanks 40 also extend into compartments 23 to couple bearing 22 to camstack 12. Actuator 34 includes ring 33 having an outer rim 44 and a ramp surface 46. As will be hereinafter discussed, an axial movement of shaft 36 causes the actuator 34 to open or close line switch 48 through a slider 50 and a follower 52 carried by movable blade 54 of the switch. Slider 50 is mounted in a slot (not shown) of support plate 24.

Clutch means 56 includes a toothed member 58 fixedly carried on shaft 36 and teeth 60 carried on bearing 22. Engagement of teeth 62 carried on toothed member 58 with teeth 60 permits camstack to be manually set in a manner to be described.

In accordance with the invention a detent assembly 63 is provided which limits the axial movement of shaft 36 and thus provides a positive location of the shaft. Detent assembly 63 includes a plurality of spring fingers 64 extending into bore 65 of bearing 22 and grooves 66 and 68 in shaft 36. The spring finger selectively engages the grooves and positively holds the shaft in place with through lugs 67 extending from the distal ends of the fingers.

Figure 2:
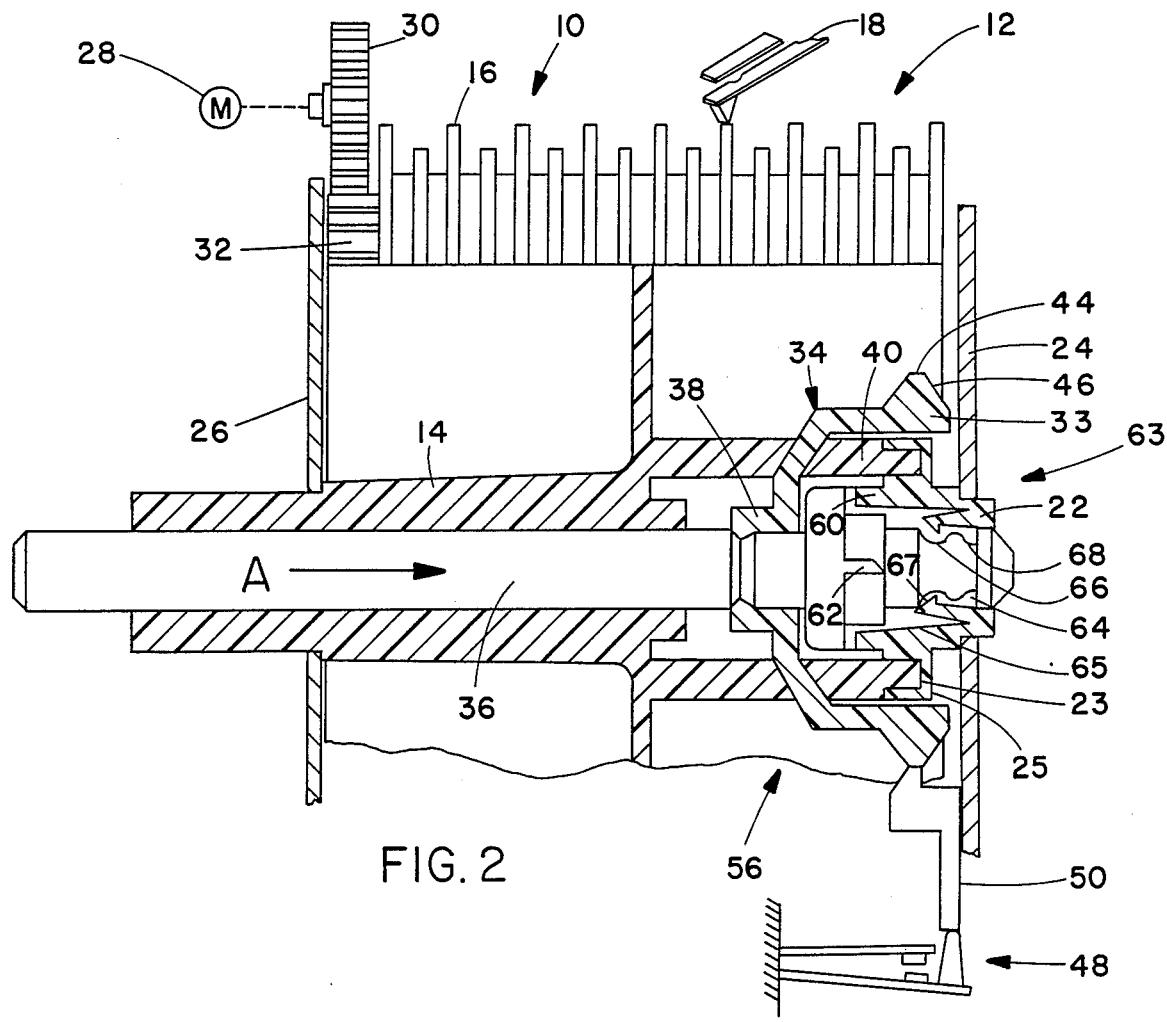
FIG. 2 and 3 are sections of a portion of a timing mechanism using the detent assembly of FIG. 1 in the assembly's two different operating modes.

The operation of the clutch, line switch and detent assembly can now be described. Referring to FIG. 2, the operating mode of the timing mechanism is shown without electrical power being applied to the timing mechanism. Shaft 36 has been axially moved outward in the direction of arrow A to move slider 50 up ramp 46 to the top of rim 44 to force switch blade 54 down and open switch 48. Teeth 60 and 62 are engaged to permit the appliance operator to manually set the camstack through shaft 36. Fingers 64 have engaged groove 66 to arrive at the proper axial movement of the shaft.

Figure 3:
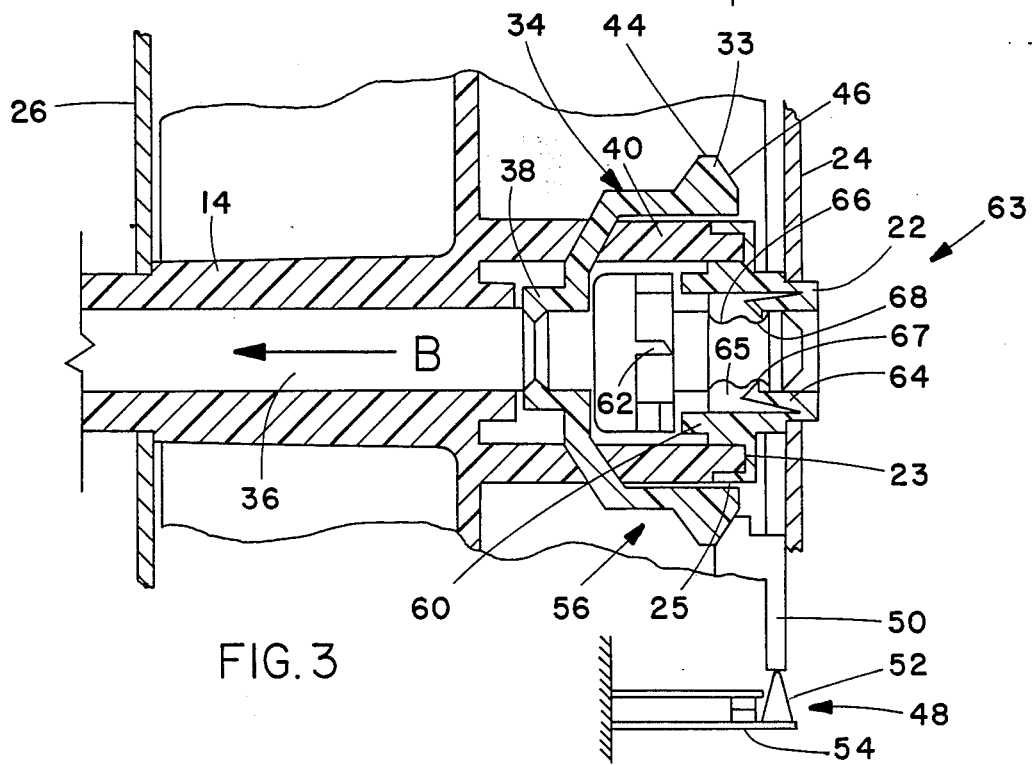

In FIG. 3, shaft 36 has been indexed in the direction of arrow B along with actuator 34 to permit slider 50 to move down ramp 46 to close line switch 48 and apply electrical power to the timing mechanism. Teeth 60 and 62 are disengaged to prevent manual rotation of camstack 12 with power applied to the timing mechanism. Camstack 12 is rotated by motor 28 through gears 30 and 32. Actuator 34, bearing 22, tooth member 58 as well as shaft 36 are rotating with the camstack. Fingers 64 have engaged groove 68 to assure the proper axial movement of the shaft.

What is claimed is:

1. A timing mechanism comprising:

a support, a camstack having a hollow hub, said camstack rotatably mounted in said support;

first switch means engaging said camstack to be actuated thereby;

a bearing rotatably journalled in said support;

a shaft rotatably mounted within said camstack and in said bearing and axially movable between a first position and a second position;

clutch means for engaging and disengaging said shaft and said camstack when said shaft is moved between said positions;

detent means for locating said shaft in either said first position or said second position, said detent means comprising a plurality of grooves formed in said shaft and spring fingers integrally formed with said bearing and engaging one of said grooves when said shaft is in said first portion and another of said grooves when said shaft is in said second position.

2. A timing mechanism according to claim 1 wherein said spring fingers include lugs for engaging said grooves.

3. A timing mechanism according to claim 1 wherein said bearing has a bore in it and said spring fingers extend into said bore of said bearing.

4. A timing mechanism according to claim 1 and further including second switch means controlling power to said timing mechanism, a switch actuator means on said shaft for selectively actuating said second switch means, and coupling means for coupling said actuator means and said bearing to said camstack.

5. A timing mechanism according to claim 4 wherein said coupling means includes tangs extending lengthwise from said hollow hub, said bearing includes a cup shaped portion having ribs therein dividing said cup shaped portion into compartments, and said tangs extend into said compartments.

* * * * *